United States Patent [19]
Saji et al.

[11] Patent Number: 5,342,107
[45] Date of Patent: * Aug. 30, 1994

[54] VEHICULAR ROOF DRIP MOULDING

[75] Inventors: Tomohide Saji; Yoshihisa Inoue, both of Shizuoka; Asajiro Kii, Hiroshima, all of Japan

[73] Assignees: Suzuki Motor Corporation, Shizuoka; Nishikawa Rubber Co., Ltd., Hiroshima, both of Japan

[*] Notice: The portion of the term of this patent subsequent to May 30, 2008 has been disclaimed.

[21] Appl. No.: 329,587

[22] Filed: Mar. 28, 1989

[30] Foreign Application Priority Data

May 13, 1988 [JP] Japan ................ 63-116075

[51] Int. Cl.$^5$ ............................. B60J 5/04
[52] U.S. Cl. ................... 296/210; 296/213; 49/490.1
[58] Field of Search ............ 296/213, 210; 49/490, 49/495

[56] References Cited

U.S. PATENT DOCUMENTS

| 4,472,469 | 9/1984 | Thies | 49/490 |
| 4,508,383 | 4/1985 | Tsumoto et al. | 296/213 |
| 4,653,801 | 3/1987 | Shirasu et al. | 296/213 |
| 4,678,827 | 7/1987 | Castagno | 296/213 |
| 4,843,759 | 7/1989 | Kisanuki et al. | 49/490 |

FOREIGN PATENT DOCUMENTS 190043 10/1984 Japan .

Primary Examiner—Robert R. Song
Attorney, Agent, or Firm—McGlew and Tuttle

[57] ABSTRACT

A vehicular roof drip moulding comprising a substantially U-shaped clamp portion adapted to be fitted onto a flange portion on the side body of an automotive vehicle in a clamped state, and a pressure contact portion extending from one side part of said clamp portion and coming in pressure contact with the side body under the effect of resilient force of the clamp portion. The other one of the pair of oppositely located pieces has a sectional height which is varied in correspondence to variation of height of the side body from location to location in the longitudinal direction.

5 Claims, 3 Drawing Sheets

VEHICULAR ROOF DRIP MOULDING

FIELD OF THE INVENTION AND RELATED ART STATEMENT

The present invention relates to a vehicular roof drip moulding.

A conventional vehicular roof drip moulding is typically constructed in the following manner.

FIG. 6 is a sectional view illustrating the upper part of a side body of an automotive vehicle for which a roof drip moulding 33 is fitted. A flange portion 32 is formed at the joint location where a side body 30 and a roof panel 31 are jointed to each other so that the roof drip moulding 33 is fitted onto the flange portion 22. In detail, the side body 30 comprises an outer panel 34, an inner panel 35 and an extension 36 which are connected to each other by spot welding to build a closed sectional configuration. The roof drip moulding 33 is clamp fitted onto the flange-portion 32 which comprises a bent portion 34a of the outer panel 34 and a bent portion 31a of the roof panel 31 in a connected state.

As will be apparent from the drawing, the conventional roof drip moulding 33 comprises a substantially U-shaped clamp portion including a pair of oppositely located pieces 33a and 33b and an extension 33c extending from one of the pair of oppositely located pieces identified by reference numeral 33a. Usually, the conventional roof drip moulding 33 is produced by way of steps of extruding ABS resin and then bending the extruded resin.

With respect to the conventional roof drip moulding 33 as produced in that way, however, it has been found that there arises a malfunction that the roof drip moulding 33 fails to come in tight contact with the side body 30 due to its irregular configuration attributable to the aforementioned steps of production. Once such a malfunction has occurred, the roof drip moulding 33 exhibits a degraded appearance and can not provide a sufficient waterproofing effect. Further, since there is a need of placing a snap hook on the roof panel 31 for the purpose of fitting the roof drip moulding 33, a high degree of accuracy is required in working the side body 30.

OBJECTS AND SUMMARY OF THE INVENTION

The present invention has been made with the foregoing background in mind and its object resides in providing a vehicular roof drip moulding which assures that any variation in configuration of the side body can be absorbed satisfactorily and an adequate measure for providing an excellent property of watertightness can be taken.

Other object of the present invention is to provide a vehicular roof drip moulding which can be produced at an inexpensive cost and which has an excellent property of fitting.

To accomplish the above objects, the present invention provides a vehicular roof drip moulding comprising a substantially U-shaped clamp portion adapted to be fitted onto the flange portion of a side body of an automotive vehicle in a clamped state and a pressure contact portion extending from one of a pair of oppositely located pieces constituting the clamp portion to come in contact with the side body under the effect of resilient force of the clamp portion, the other one of the pair of oppositely located pieces having a sectional height varied from location to location on the side body.

According to the present invention, the other one of the pair of oppositely located pieces can normally be brought in tight contact with the side body of an automotive vehicle irrespective of variation in configuration of the side body (representative of variation in height of the same). Thus, a sufficient waterproofing effect can be provided by the roof drip moulding of the present invention accompanied by an improved appearance.

Further, since the roof drip moulding of the present invention can be produced in accordance with an extrusion process, it can be provided at a remarkably reduced production cost. Another advantageous effect is that it has more degrees of freedom in relation to the fitting operation as compared to the conventional roof drip moulding which has been produced using a bender and the device of the invention has an excellent property of fitting.

These and other objects, features and advantages of the present invention will become more readily apparent from a reading of the following description which has been made with reference to the accompanying drawings.

BRIEF DESCRIPTION OF THE ACCOMPANYING DRAWINGS

The present invention will be illustrated in the following drawings in which:

FIG. 1 is a fragmental perspective view illustrating the vehicular body of an automotive vehicle for which the roof drip moulding of the present invention are employed.

FIG. 2 is an enlarged sectional view taken in a line A—A in FIG. 1.

FIG. 3 is an enlarged sectional view taken in a line B—B in FIG. 1.

FIG. 4 is an enlarged sectional view taken in a line C—C in FIG. 1.

FIG. 5 is a sectional view schematically illustrating the configuration of a roof drip moulding to be fitted in a corner section on the vehicular body.

DETAILED DESCRIPTION OF THE PREFERRED EMBODIMENT

Now, the present invention will be described in a greater detail hereinafter with reference to FIGS. 1 to 5 which illustrate a preferred embodiment thereof.

Figure 1:
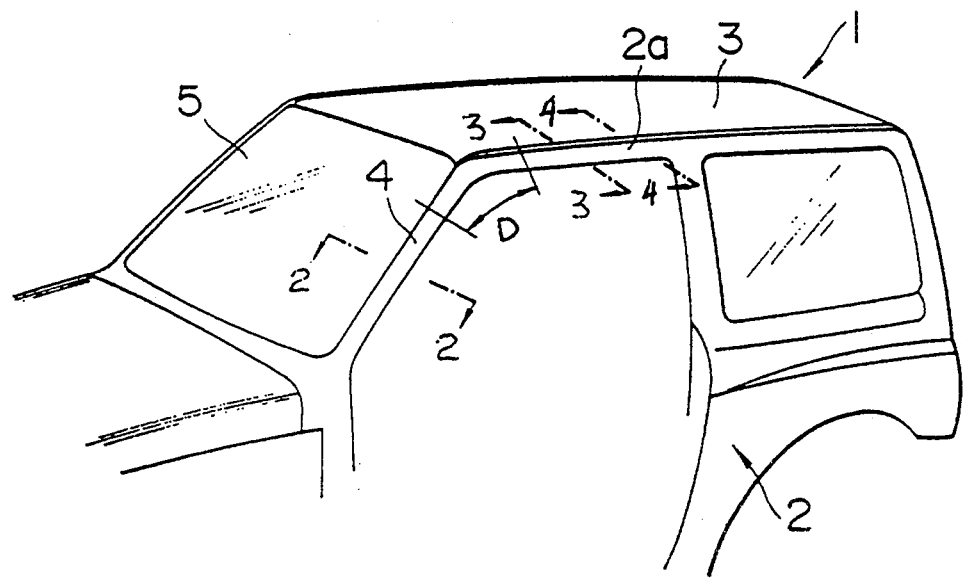
FIGS. 1 to 5 illustrate a vehicular roof drip moulding in accordance with a preferred embodiment of the present invention.

FIG. 1 is a perspective view illustrating a vehicular body 1. A series of roof drip moulding 6 are successively fitted along the joint portion between the upper part 2a of a side body 2 and a roof panel 3 and the joint portion between a front pillar 4 constituting the side body 2 and a front glass 5, as shown in FIGS. 2 to 5.

Specifically, as will be apparent from these drawings, the roof drip moulding 6 in accordance with the illustrated embodiment of the present invention is constructed in a double-walled structure comprising a body portion 7 which is a material which is comparatively soft (as represented by a hardness of 60°) and has an excellent elasticity and an outer surface portion 8 adhesively attached to the outer surface of the body portion 7, the outer surface portion 8 being formed of material which is comparatively hard (as represented by a hardness of 90°). The body portion 7 comprises a substantially U-shaped clamp portion 11 including a pair of oppositely located parts 9 and 10 and a pressure contact portion 12 molded integral with one of the pair of oppositely located parts identified by reference numeral 9 (one side part 9). The respective oppositely located parts 9 and 10 are provided with a pair of pawl pieces 13 on their oppositely located surfaces in accordance with an integral molding process. On the other hand, the pressure contact portion 12 has a hollow space 14 formed therein and includes a pair of pressure contact parts 15 and 16 on both sides of the lower end surface. In addition, the other one of the pair of oppositely located parts identified by reference numeral 10 is formed with a depending part 17 downwardly extending beyond the pressure contact parts 15 and 16 and a lip part 18 slantwise extending in the downward direction, in accordance with an integral molding process. With such construction, the pair of oppositely located parts 9 and 10 and the pair of pressure contact parts 15 and 16 are not symmetrically arranged with respect to their height, respectively, but they are different in height from each other.

To assure that the U-shaped clamp portion 11 provides a sufficient clamping force, it has an U-shaped core rod 19, having an excellent resiliency, embedded therein.

Figure 3:
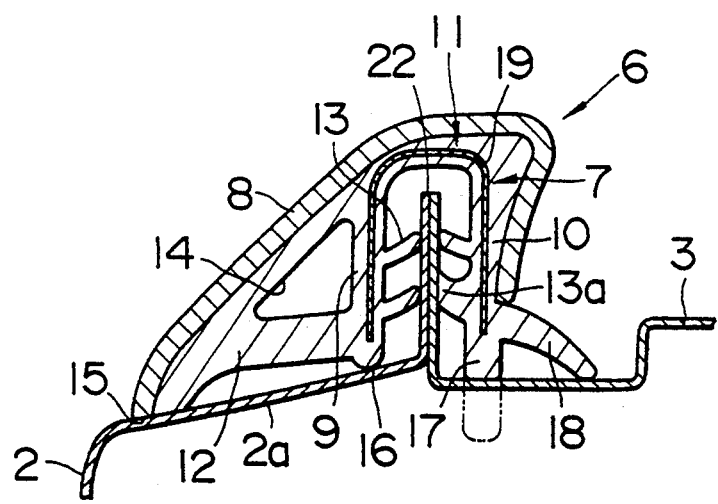
Figure 4:
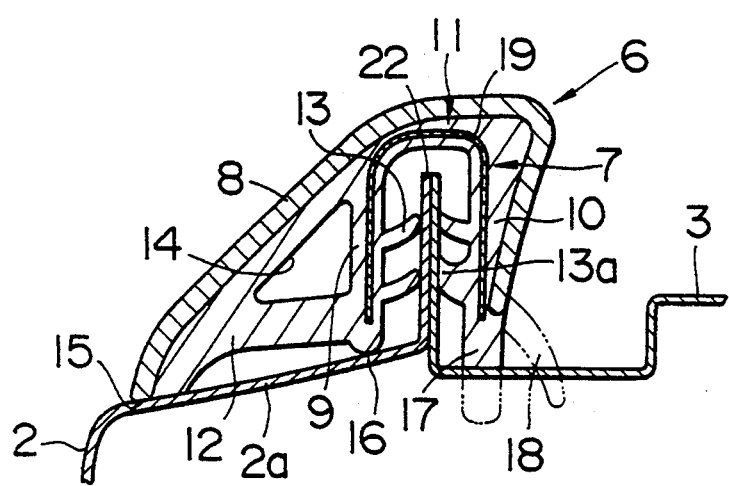

Since the side body 2 does not have a constant height but varies in height from position to position, a part of the roof drip moulding 6 adapted to be fitted to the side body 2, i.e., the depending part 17 of the clamp portion 11 does not have a constant height at every location. In practice, as shown in FIGS. 3 and 4, the depending part 17 has a part cut off therefrom as represented by two-dot chain lines in correspondence to the locations on the roof panel 3, i.e., the location where the roof panel 3 is taken along a line B—B in FIG. 1 and the location where it is taken along a line C—C in FIG. 1. Consequently, the lower end of the depending part 17 is located slightly downward of the inside pressure contact part 16. A part of the upper part 2a of the side body 2 located in the proximity of the corner section D (see FIG. 1) is formed with a lip part 18, as shown in FIG. 3 but a part of the same remote from the corner section D is not formed with a lip part such as the lip part 18 in FIG. 3, as shown in FIG. 4.

Figure 5:
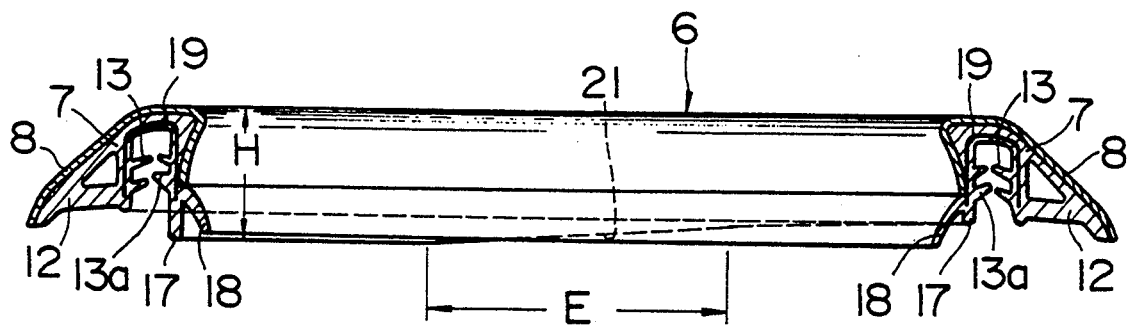
Figure 6:
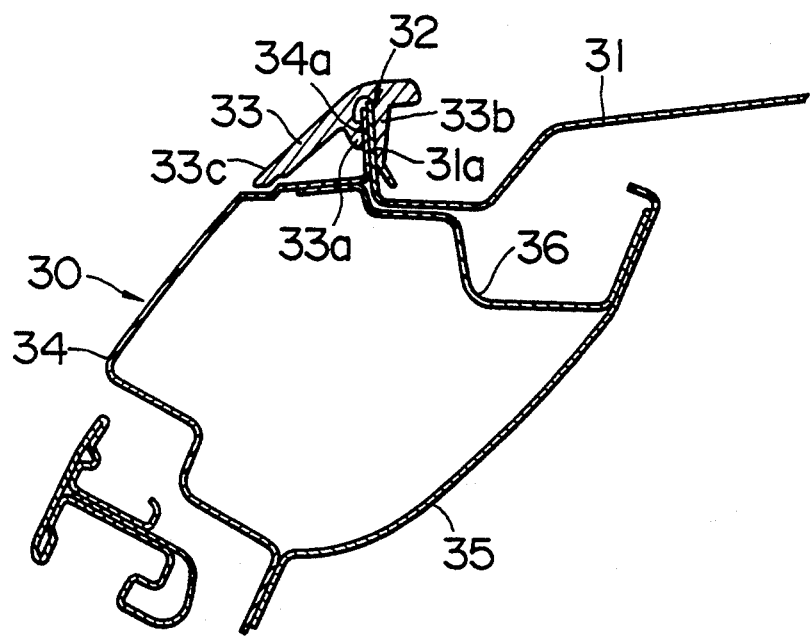
FIG. 6 is a sectional view illustrating a conventional vehicular roof drip moulding.

As schematically illustrated in FIG. 5, in the corner section D on the vehicular body 1, the depending part 17 of the roof drip moulding 6 is so designed that its height is gradually reduced in correspondence to variation in height of the roof body 2 in an intermediate region (or intermediate length) E extending from the force part of the vehicular body (left-hand side as viewed in FIG. 5) to the rear part of the same (right-hand side as viewed in FIG. 5) with the result that a sectional height H of the oppositely located part 10 is reduced gradually. In this connection, reference should be made to a slantwise extending plane 21 in FIG. 5. It should be noted that the lip part 18 on the roof drip moulding 6 is not subjected to cutting but it has a constant length at every location in the corner section D. With respect to a part of the roof drip moulding 6 adapted to be fitted to the vehicular body in the corner section D, there is seen a tendency that the pair of oppositely located parts 9 and 10 are expanded outwardly during a period of fitting operation. This causes the clamp portion 11 located at the foregoing part in the corner section D to be designed with an acute angle more than at other part to such an extent that the pawl parts 13 on both the sides come in contact with each other.

Next, to more clearly define the structure of the roof drip moulding 6, description will be made below as to the fitting state of the roof drip moulding 6 at the respective parts on the vehicular body 1.

Figure 2:
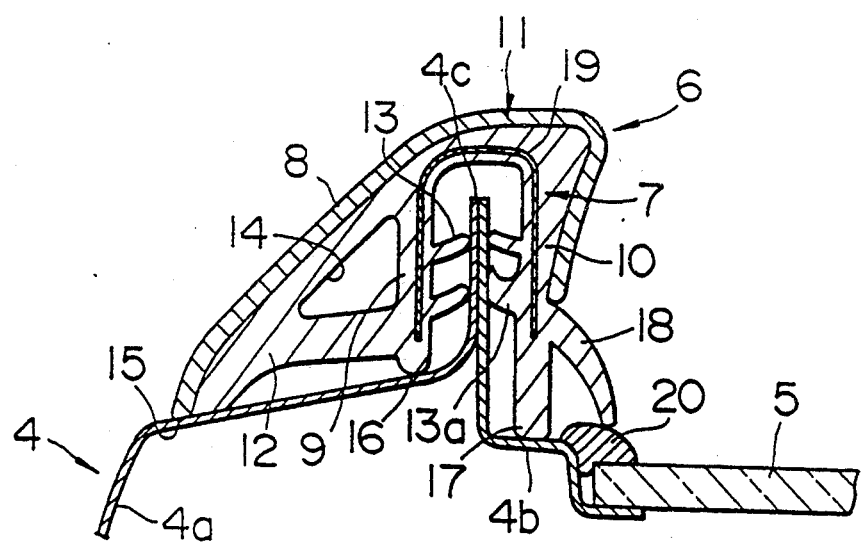

First, with respect to the part corresponding to the front pillar 4, as shown in FIG. 2, the clamp portion 11 of the roof drip moulding 6 is fitted onto the joint portion 4c (representative of the flange portion) between an outer panel 4a and an inner panel 4b constituting the front pillar 4 so that the depending part 17 comes in contact with the inner panel 4b and the pressure contact parts 15 and 16 come in contact with the outer panel 4a. At this moment, the pawl parts 13 in the clamp portion 11 come in pressure contact with the flange portion 4c and the outside pressure contact part 15 comes in tight contact with the outer panel 4a under the effect of restorable resilient force of the depending part 17 and the pawl pieces 13a. Incidentally, a pin lace 20 is extended along the periphery of the front glass 5 and the lip part 18 on the roof drip moulding 6 is brought in contact with the pin moulding 20. This arrangement prevents the inner panel 4b from being exposed to the outside through a gap between the pin moulding 20 and the depending part 17.

Next, with respect to the corner section D, the slantwise extending plane 21 formed in the longitudinal direction of the depending part 17 is brought in tight contact with the side body 2 while absorbing variation in height of the side body 2.

Further, with respect to a location on the upper part 2a of the side body 2 in the proximity of the corner section D, as shown in FIG. 3, the clamp portion 11 of the roof drip moulding 6 is fitted onto the joint portion 22 (representative of the flange portion) between the side body 2 (representative of the side panel) and the roof panel 3. With this arrangement, the pressure contact parts 15 and 16 come in contact with the side body 2, and the depending part 17 of the oppositely located part 10 of which lower end part is shorted by cutting and the lip part 18 come also in contact with the roof panel 3. In addition, with respect to a location remote from the corner section D, as shown in FIG. 4, no lip part is provided but the pawl pieces 13a and the depending piece 17 of which height is reduced by cutting are brought in contact with the roof panel 3.

With the roof drip moulding 6 as constructed in the above-described manner, the pawl pieces 13a and the depending part 17 of the body portion 7 come in contact with the roof panel 3 at two locations so that a certain intensity of pressure contact force is imparted to the outside pressure contact part 15, resulting in the latter being brought in tight contact with the side body 2. Additionally, the lip part 18 comes in tight contact with the pin moulding 20 and the roof panel 3 under the effect of its own resilient force. This prevents rain water or the like fluid from being introduced toward the panel joint portions 4c and 22. Further, undesirable introduction of rain water or the like fluid can additionally be prevented by the pawl pieces 13. In this case, since the vehicular body to which the roof drip moulding 6 is fitted does not have a constant height, a sectional height of the depending part 17 is varied in corresponding to the height of the vehicular body at the respective locations. This allows variation in configuration of the vehicular body to be absorbed adequately, resulting in an improved appearance being assured.

Since the roof drip moulding 6 of the present invention has a comparatively hard outer surface 8 extending over the outer area, it provides a sufficiently high value of hardness on the whole. On the other hand, since the body portion 7 of the roof drip moulding 6 is constituted by soft members each having an excellent resiliency, a satisfactory waterproofing effect can be provided by a plurality of pawl parts 13 in the form of protrusions.

Further, since the pressure contact portion 12 has a hollow space 14 formed therein, reduction of extra wall thickness and prevention of an occurrence of shrinkage during a period of molding operation can be achieved by employing the roof drip moulding of the present invention.

With respect to the corner section D, there is seen a tendency that a pair of oppositely located parts 9 and 10 are expanded away from each other when the clamp portion 11 is fitted onto the joint portion. In view of the foregoing tendency, a distance between the inside pressure contact part 16 and the depending part 17 in the corner section D is previously determined less than that in other locations so that watertightness in the corner section D is assured.

Since the roof drip moulding 6 of the present invention can be molded by extruding rubber or the like elastomeric material, it can be produced at an inexpensive cost.

While the present invention has been described above with respect to a single preferred embodiment, it should of course be understood that it should not be limited only to this but various changes or modifications may be made without departure from the scope of the present invention as defined by the appended claims.

The present invention has been described with respect to an embodiment wherein the roof drip moulding 6 are extended from the front section to the side section of an automotive vehicle. Alternatively, it may be applied to roof drip moulding to be used in other sections.

We claim:

1. A vehicular roof-drip moulding for connection to a side body having a flange portion, the side body varying in height along the length of the side body, comprising: a substantially U-shaped clamp portion, clamp-fitted onto the flange portion of the side body; a pressure contact portion extending from one side part of said clamp portion and coming in pressure contact with said side body under the effect of a resilient force of the clamp portion; and another side part of said clamp portion having a depending contact part, said depending contact part having a first length with a first sectional height, having a second length with a second sectional height, the sectional height of the first length being greater than the sectional height of the second length and an intermediate length having a sectional height which diminishes from said first sectional height to said second sectional height between said first length and said second length, said sectional height of said intermediate length varying in correspondence to the varying height of the side body along the length of the side body; and, a lip part connected to said depending contact part along a portion of said depending contact part.

2. A vehicular roof drip moulding according to claim 1, wherein said clamp portion is formed of a body portion, said body portion being connected to an outer surface portion, said body portion and said outer surface portion cooperating to form a two-piece structure.

3. A vehicular roof dripping moulding according to claim 1, wherein said clamp portion is formed of a body portion defining a hollow space adjacent said clamp portion between said clamp portion and said pressure contact portion.

4. A vehicular roof drip moulding according to claim 1, wherein said one side part and said other side part comprise a pair of oppositely located parts having pawl pieces connected thereto with pawl ends engaging the flange portion of the side body.

5. A vehicular roof-drip moulding for connection to a side body having a flange portion, the side body varying in height along the length of the side body, comprising: a substantially U-shaped clamp portion, clamped onto the flange portion of the side body; a first pressure contact portion extending from one side part of said clamp portion and coming in pressure contact with said side body, at a first location under the effect of a resilient force of the clamp portion and a second pressure contact portion extending from said one side part and coming in pressure contact with said body at a second location, spaced from said first location; and another side part of said clamp portion having a depending contact part having a surface in contact with said side body, said depending contact part having a first length with a first sectional height, having a second length with a second sectional height, the sectional height of the first length being greater than the sectional height of the second length and an intermediate length having a sectional height which varies substantially linearly from said first sectional height to said second sectional height between said first length and said second length, said sectional height of said intermediate length varying in correspondence to the varying height of the side body along the length of the side body; and, a lip part connected to said depending contact part along a portion of said depending contact part.

* * * * *